United States Patent [19]

Woo et al.

[11] Patent Number: 5,116,888
[45] Date of Patent: May 26, 1992

[54] EPOXY-ACRYLIC GRAFT COPOLYMERS WITH PHOSPHONIUM COCATALYSTS CARBON-GRAFT

[75] Inventors: James T. K. Woo, Medina; Gary C. Pompignano, North Royalton, Ohio

[73] Assignee: The Glidden Company, Cleveland, Ohio

[21] Appl. No.: 593,647

[22] Filed: Oct. 4, 1990

Related U.S. Application Data

[63] Continuation-in-part of Ser. No. 411,925, Sep. 22, 1989, abandoned.

[51] Int. Cl.⁵ .............................................. C08F 283/10
[52] U.S. Cl. .................................... 523/409; 523/411; 523/412; 525/531
[58] Field of Search ................. 525/531; 523/409, 412, 523/411

[56] References Cited

U.S. PATENT DOCUMENTS

| | | | |
|---|---|---|---|
| 4,212,781 | 7/1980 | Evans | 523/404 |
| 4,285,847 | 8/1981 | Ting | 523/423 |
| 4,540,752 | 10/1985 | McFadden | 525/531 |

FOREIGN PATENT DOCUMENTS 1073906  6/1967  United Kingdom ............... 525/531

Primary Examiner—John C. Bleutge
Assistant Examiner—Robert E. L. Sellers II
Attorney, Agent, or Firm—Thomas M. Schmitz

[57] ABSTRACT

A process for non-aqueous copolymerization of ethylenically unsaturated monomers including carboxyl functional monomers in the presence of epoxy resin by in-situ copolymerization is improved by utilizing a catalyst (initiator) combination of less than 2% peroxide and between 0.05% and 0.1% phosphonium catalyst. The carboxyl functional polymer can be aminated and dispersed into water to produce a protective coating composition useful for interior surfaces of beer and beverage cans.

10 Claims, No Drawings

EPOXY-ACRYLIC GRAFT COPOLYMERS WITH PHOSPHONIUM COCATALYSTS CARBON-GRAFT

This is a continuation in part of application Ser. No. 411,925 filed Sep. 22, 1989, now abandoned, which is incorporated herein specifically by reference.

This invention relates to polymeric compositions and processes particularly useful in protective surface coating compositions, and more particularly pertains to aqueous dispersed, carbon-graft, epoxy-acrylic copolymers useful as polymeric binders in coating compositions particularly useful for interior beverage and food containers and similar sanitary coating applications.

Epoxy resins are particularly desirable for use in surface coating materials as a vehicle or polymeric binder for pigments, fillers, and other additives whereby epoxy resins advantageously provide toughness, flexibility, adhesion, and chemical resistance. Water-dispersed coating compositions containing epoxy resins are highly desirable for can coating compositions. Coatings for soft drink and beer cans, for instance, are critical due to taste sensitivity wherein such sanitary can coatings must not alter the product taste of canned beverages. Taste problems can occur in a variety of ways such as by leaching of coating components into the beverage, or by adsorption of flavor by the coating, or sometimes by chemical reaction, or by some combination thereof. In commonly assigned U.S. Pat. No. 4,212,781, a process is disclosed for modifying epoxy resin by reacting the epoxy resin with addition polymerizable monomer in the presence of at least 3% by weight of benzoyl peroxide (or the free radical initiating equivalent thereof) based on monomer at a suitable reaction temperature. This reaction produces a reaction mixture containing an in-situ formed blend of resinous materials comprising an epoxy-acrylic copolymer mixture containing epoxy resin, a carbon graft epoxy-acrylic polymer, and associatively-formed ungrafted addition polymer. The in-situ polymerized monomers include acid functional monomers to provide acid functionality in the reaction mixture sufficiently high to effect stable dispersion of the resulting reaction product in a basic aqueous medium. In a preferred embodiment of U.S. Pat. No. 4,212,781, a polyglycidyl ether of bisphenol-A is reacted with a mixture of addition polymerizable monomers containing an acrylic such as methacrylic acid. The epoxy resin has a molecular weight above 4,000 and provides from 50% to 90% of the initial reaction mixture. The reaction takes place in the presence of benzoyl peroxide at an elevated temperature above 80° C. and preferably between about 110° C. and 130° C. to effect addition polymerization of the monomer and produce addition polymer grafted to the epoxy resin. The reaction product can be dispersed in a basic aqueous medium to form a water-reducible epoxy-acrylic copolymer mixture. The use of at least about 3% by weight peroxide catalyst in the in-situ polymerization of monomers is considered critical in the patented invention to obtain sufficient carbon-to-carbon grafting of acrylic to the epoxy backbone which in turn is necessary to obtain the requisite stability and coating film integrity properties.

In commonly assigned U.S. Pat. No. 4,480,058, an epoxy-acrylic ester graft copolymer is produced from epoxy resin and copolymerized monomers including carboxyl monomers wherein the epoxy acrylic ester graft copolymer comprises acidic or carboxylic copolymer esterified with epoxy resin. The epoxy-acrylic ester graft copolymer can be produced by esterifying a solvent-soluble carboxy functional polymer with an epoxy resin containing epoxide groups wherein the esterification reaction is carried out preferably in an organic solvent and in the presence of sufficiently high amounts of amine catalyst to produce a nongelled epoxy ester graft copolymer.

It now has been found that stable, carbon-graft, epoxy-acrylic copolymers dispersed in water can be produced by reacting ethylenic monomers, including carboxyl functional monomers, in the presence of epoxy resin by using low levels of peroxide catalyst in combination with very low amounts of a cocatalyst consisting of a triphenylphosphonium compound to produce a carbon-graft, epoxy-acrylic copolymer. The resulting carbon-graft, epoxy-acrylic copolymer can be readily dispersed into water by neutralizing the polymer carboxyl groups with amine compounds to produce long term stability of the aqueous polymeric mixture. The aqueous dispersed epoxy-acrylic copolymer is particularly useful for protective coatings for the interior of cans. These and other advantages of this invention will become more apparent by referring to the detailed description of the invention as well as the illustrative examples.

SUMMARY OF THE INVENTION

Briefly, the invention pertains to a carbon-graft, epoxy-acrylic copolymer produced by copolymerizing ethylenic monomers including carboxyl monomers in the presence of epoxy resin by in-situ copolymerization of the monomers. The monomers are copolymerized in the presence of between about 0.05% and 3% peroxide catalyst, preferably 1% to 2% peroxide catalyst, based on the weight of monomers copolymerized in combination with very low levels of a co-catalyst preferably consisting of triphenylphosphonium compound. On a weight basis, the resulting epoxy-acrylic copolymer composition comprises between 30% and 90% epoxy resin and between 70% and 10% acrylic polymer.

DETAILED DESCRIPTION OF THE INVENTION

The invention is based on in situ copolymerization of ethylenically unsaturated monomers in the presence of epoxy resin using low levels of peroxide catalyst and a co catalyst consisting of a phosphonium compound.

The epoxy-acrylic copolymer is a carbon-graft copolymer comprising epoxy resin coreacted with monomers including acrylic monomers to produce a carbon-graft epoxy-acrylic graft copolymer. The preferred epoxy-acrylic copolymer comprises an epoxy-acrylic carbon-graft copolymer containing epoxy resin, epoxy-acrylic carbon-graft copolymer, and ungrafted addition polymer produced by polymerizing ethylenically unsaturated monomers in-situ with epoxy resin in the presence of a peroxide and the cocatalyst. The in situ polymerization of monomers generally comprises reacting the ethylenically unsaturated monomers in the presence of epoxy with less than 3% of benzoyl peroxide by weight of the monomer. The in-situ formed carboxyl-functional polymer can have a molecular weight between 1,000 and 100,000 and preferably between 2,000 and 10,000. The carboxyl content (—COOH) should comprise at least 2% by weight of the monomer mixture and preferably should be above 5%.

The acrylic portion of the carbon-graft epoxy-acrylic copolymer comprises polymerized ethylenically unsaturated monomers which include carboxyl functional monomers such as acrylic acid and lower alkyl substituted acrylic acids such as methacrylic acid to provide carboxyl functionality means for dispersing the epoxy-acrylic copolymer mixture into water. The preferred acrylic acid is methacrylic acid. The balance of the monomers preferably are nonreactive under the contemplated conditions of polymerization, although small amounts of other reactive monomers may be used such as hydroxy monomers illustrated by 2-hydroxy ethyl methacrylate, amide monomers illustrated by acrylamide, or N-methylol monomers illustrated by N-methylol acrylamide. The remaining monomers are nonreactive but copolymerizable ethylenic monomers illustrated by acrylate and methacrylate esters, such as ethyl acrylate, methyl methacrylate or isobutyl methacrylate, styrene, or vinyl toluene, vinyl acetate, vinyl chloride, vinylidene chloride, acrylonitrile, and generally alkyl esters of an acrylic acid, generally the lower alkyl esters, that is, those esters in which the esterifying group contains from 1 to 4 carbon atoms, and particularly ethyl acrylate. Other useful monomers in this class include other $C_{1-15}$ alkyl acrylate esters and methacrylate esters such as, for example, propyl acrylate, isopropyl acrylate, butyl acrylate, isobutyl acrylate, tertiary butyl acrylate, pentyl acrylate, decyl acrylate, lauryl acrylate, isobornyl acrylate, methyl methacrylate, butyl methacrylate, isobutyl methacrylate, hexyl methacrylate, 2-ethyl hexyl methacrylate, octyl methacrylate, and nonyl methacrylate. Other useful monomers are those readily commercial available monomers having vinyl unsaturation and include styrenic monomers such as styrene, vinyl toluene, divinyl benzene, isoprene and butadiene.

The epoxy resin portion of the epoxy-acrylic copolymer mixture can be either aliphatic or aromatic, although the aromatic epoxy resins are preferred. The most preferred epoxy resins are polyglycidyl ethers of bisphenol-A, especially those having 1,2-epoxy equivalency of from about 1.3 to about 2. The molecular weight should be from about 350 to about 20,000, and preferably, for sanitary coating compositions, from about 4,000 to about 10,000. Mixtures of monoepoxides and diepoxides are desirable. Another procedural variation is the introduction of the aromatic polyether which is devoid of oxirane functionality by reacting epoxide groups with benzoic acid, phenol or similar monoreactive epoxide blocking agent. In preferred practice, the epoxy resin is a mixture including aromatic polyether having a single oxirane group and aromatic polyether having two oxirane groups. This mixture of epoxy functionality maximizes compatibility, although the aromatic polyether devoid of oxirane functionality can be added later, and the mixture can be heated and agitated to enhance the intimacy of the association between the various components.

Epoxy resins are predominantly linear chain molecules comprising the coreaction product of polynuclear dihydroxy phenols or bisphenols with halohydrins to produce epoxy resins containing at least one and preferably two epoxy groups per molecule. The most common bisphenols are bisphenol-A, bisphenol-F, bisphenol-S, and 4,4'dihydroxy bisphenol, with the most preferred being bisphenol-A. Halohydrins include epichlorohydrin, dichlorohydrin, and 1,2-dichloro 3-hydroxypropane with the most preferred being epichlorohydrin. Preferred epoxy resins comprise the coreaction product of excess molar equivalents of epichlorohydrin and bisphenol-A to produce predominantly an epoxy group terminated linear molecular chain of repeating units of diglycidyl ether of bisphenol-A containing between 2 and 25 repeating copolymerized units of diglycidyl ether of bisphenol-A. In practice, an excess molar equivalent of epichlorohydrin are reacted with bisphenol-A to produce epoxy resins where up to two moles of epichlorohydrin coreact with one mole of bisphenol-A, although less than complete reaction can produce difunctional epoxy resin along with monoepoxide chains terminated at the other end with a bisphenol-A unit. The most preferred linear epoxy resins are polyglycidyl ethers of bisphenol-A having terminating 1,2-epoxide groups and an epoxy equivalent weight between 2,000 and 10,000, and a number average molecular weight from about 4,000 to 20,000 as measured by gel permeation chromatography (GPC). Commercially available lower molecular weight epoxy resins include Dow Chemical epoxy resins identified by trade number and average molecular weights as follows: DER 333 (380); DER 661 (525); while Shell Chemical epoxy resins are EPON 828 (380); EPON 836 (625); EPON 1001 (525), EPON 1009F (3000); and Ciba-Geigy linear epoxy resins GT-7013 (1400); GT-7014 (1500); GT 7074 (2000); and GT-259 (1200). Although not as common, trifunctional epoxy resins are useful comprising branched chain epoxy resins where the branched chains as well as the backbone chain are each terminated with a terminal epoxide group to provide greater than two epoxide functionality. Trifunctional epoxy resins can be produced by coreacting epichlorohydrin with polynuclear polyhydroxy phenols, trifunctional phenols, or aliphatic trifunctional alcohols.

The preferred carbon-graft epoxy-acrylic copolymer mixture is prepared by in-situ polymerization of the ethylenic monomers with epoxy resin. The epoxy resin can be heated in a reactor wherein the polymerizable monomer can be added slowly over a period of at least two or three hours along with a solvent and a free radical initiator. Although the reaction may be conducted in the absence of solvent, a solvent system is preferred for the in-situ polymerization of monomers in the presence of epoxy resin. A preferred solvent system comprises two miscible solvents, one of which dissolves the epoxy resin and the other of which dissolves the monomers. The particular solvents satisfactory for the epoxy resin are solvents such xylene, benzene, ethyl benzene, toluene, and the alkoxy alkanols. For the monomer, alcohols such as methanol, ethanol, propanol, butanol, and the like, are suitable, with butanol being preferred. Ethylene glycol monobutyl ether, ethylene glycol monobutyl ether acetate, and the like, hexane, mineral spirits, and the like, are also suitable. For subsequent dispersion into water, the solvents selected should be water-soluble materials, as are acetone, butanol, ethanol, propanol, ethylene glycol monoethyl ether, and the like. Ordinarily the amount of solvent may be in the range from about 5% to 30% by weight of the sum of the other components. In practice, the epoxy resin and the mixture of polymerizable monomers are reacted together in the presence of a free radical initiator, preferably of the peroxide type, and benzoyl peroxide is most preferred. Typical and useful free radical initiators include cumene hydroperoxide, benzoyl peroxide t-butyl perbenzoate, t-butyl peroxide, lauryl peroxide, methyl ethyl ketone peroxide, chlorobenzoyl peroxide, and the like. Benzoyl peroxide is preferred as the free radical initiator for use in the practice of the present invention. The amount of free radical catalyst is expressed in terms of percentage by weight of benzoyl peroxide based on the total weight of the polymerizable monomer, or equivalent, at the temperature of use. The amount of peroxide catalyst should be at least about 0.05% but less than 3%, and preferably between 1% and 2% weight of benzoyl peroxide or equivalent based on monomer weight. The co-catalyst consists of a phosphonium cocatalyst generally and preferably selected from an alkyl triphenyl phosphonium or alkyl tetraphosphonium or formyl triphenylphosphonium, ethyl triphenylphosphonium acetate, ethyl triphenylphosphonium chloride, ethyl triphenylphosphonium bromide, ethyl triphenylphosphonium iodide, tetrabutylphosphonium acetate and triphenyl phosphine. Other catalysts such as formylmethylenetriphenylphosphonium or formylmethyltriphenyl phosphonium halide and other phosphonium salts such as phosphonium phosphates, phosphonium formates, phosphonium oxalates, and phosphonium bicarbonates can also be used. The useful level of cocatalyst is at least 0.01% and preferably between 0.02% and 0.1% based on the weight of the monomers copolymerized. The cocatalyst can be added with the monomers or pre-added to epoxy resin just before the addition of the monomeric mixture. The reaction temperature preferably is maintained in the range from about 80° C. to about 130° C., although the temperature may be adjusted within a relatively wide range to accommodate the reactivity of the mixture. Thus, operating temperatures in the range from about 30° C. to about 200° C. are feasible, depending upon the end results and operating conditions selected. After the monomers are added, the reaction mixture is normally held for up to three hours at reaction temperature to complete the monomer conversions. The in-situ polymerization of the monomers produces an in-situ formed carboxyl functional polymer containing at least about 20% of polymerized monoethylenically unsaturated carboxylic acid monomer based on the total weight of monomers.

The carbon-graft, epoxy-acrylic copolymer composition comprises by weight between about 10% and 70% acrylic polymer and between about 90% and 30% epoxy resin. If desired, the epoxy-acrylic copolymer can be mixed with a water dispersible crosslinking component such as aminoplast whereby the resulting composition can be heat cured to crosslink with carboxyl functionality of the epoxy-acrylic copolymer. On a polymer weight basis, the coating composition contains between 0% and 15% but preferably between 1% and 10% aminoplast crosslinking resin mixed with between 85% and 100% of the above indicated matrix polymer compositions. Molecular weights of polymers are weight average molecular weights and ordinarily can be measured by gel permeation chromatography (GPC) as set forth in ASTM D 3016-72 and ASTM D 3593 80.

Referring next to the aminoplast crosslinking resins, aminoplasts are melamine or melamine derivatives such as methylol melamine or similar alkylated melamine formaldehyde resins. Aminoplasts further include benzoguanamine, acetoguanamine, as well as ureaformaldehyde. Commercial available aminoplasts which are water-soluble or water-dispersible for the instant purpose include Cymel 301, Cymel 303, Cymel 370, and Cymel 373 (all being products of American Cyanamid, Stamford, Conn., said aminoplasts being melamine based, e.g., hexamethoxy-methyl melamine for Cymel 303), and Beettle 80 (products of American Cyanamid which are methylated or butylated ureas). Other suitable aminoplast resins are of the type produced by reaction of aldehyde and formal guanamines; ammeline; 2-chloro-4,6-diamine-1,3,5 -triazine; 2-phenyl-p-oxy-4,6-diamino-1,3,5 -tri-azine; and 2,4,6-triethyl-triamino-1,3,5 -triazine. The mono, di-, or tri-aryl melamines, such as 2,4,6-triphenyl-triamino-1,3,5 triazine, are preferred. Other aldehydes used to react with the amino compound to form the resinous material are crotonic aldehyde, acrolein, or compounds which generate aldehydes, such as hexamethylene-tetramine, paraldehyde, and the like.

For sanitary use, phenolic resin can be added to resist sulfide staining. Phenolic resin can be added to the epoxy before the monomer addition.

The water-dispersed coating compositions can be produced by mixing together the various water-dispersed polymers. The aminoplast polymer can be dispersed into water by mechanical mixing. The carbon graft epoxy acrylic copolymer is prepared in solvent and then subsequently dispersed into water using a fugitive base such as primary, secondary, and tertiary alkyl, alkanol, aromatic amines, or alkanolalkyl mixed amines such as mono-ethanol amine, dimethyl ethanol amine, diethanol amine, triethyl amine, dimethyl aniline, ammonium hydroxide, and the like, as more particularly described in U.S. Pat. No. 4,212,781. The amount of water contained in the coating composition containing the epoxy-acrylic copolymer, and the aminoplast resin depends on the viscosity desired, which in turn, relates to the method of application. For spraying, preferably the coating composition contains between about 10% and 30% by weight polymeric solids relative to 70% to 90% water including other volatiles such as minor amounts of solvents. For applications other than spraying, the aqueous polymeric dispersions can contain between about 10% and 40% by weight water. Organic solvents can be utilized to facilitate spray or other application methods and such solvents include n-butanol, 2-butoxy-ethanol-1, xylene, toluene, and preferably n-butanol is used in combination with 2-butoxy-ethanol-1. The coating composition of the present invention can be pigmented and/or opacified with known pigments and opacifiers. For many uses, including food use, the preferred pigment is titanium dioxide. The resulting aqueous coating composition can be applied satifactorily by conventional methods known in the coating industry. Thus, spraying, rolling, dipping, and flow coating application methods can be used for both clear and pigmented films, although spraying is preferred. After application onto the metal substrate, the coating is cured thermally at temperatures in the range from about 95° C. to about 235° C. or higher for time sufficient to effect complete curing as well as volatilizing of any fugitive component therein.

For metal sheet substrates intended as beverage containers and particularly for carbonated beverages such as beer, the coating should be applied at a rate in the range from 0.5 to 15 milligrams of polymer coating per square inch of exposed metal surface. To attain the foregoing, the water-dispersible coating as applied can be as thick as 0.1 to 1 mil.

For a better understanding of the present invention, the following examples are provided. In this application, all parts are parts by weight, all percentages are weight percentages, and temperatures are degrees Centigrade, unless otherwise expressly noted.

EXAMPLE 1

Into a 5 liter round bottom, four necked flask was charged 650 g. of DER 333 (liquid epoxy resin from Dow Chemical Company), 350 g. of bisphenol A and 176 g. of 2-butoxyethanol. The flask was fitted with a water cooled condenser, nitrogen inlet, air-driven mechanical stirrer and thermometer. The reaction was heated under 20" vacuum, with agitation and nitrogen sparge to 150° C. Heating was turned off, and an exotherm raised the temperature to 175° C. Vacuum was disconnected and nitrogen sparge was continued. A small amount of volatile, about 16 ml. was also collected. The temperature was held at 175° C. for about 2 hours and a viscosity (Gardner-Holt viscosity) Z2+ was obtained. The sample was cut to 40% NV in 2-butoxyethanol for the viscosity measurement. A solicut blend of 98 of 2-butoxyethanol and 470 g. of n-butanol was then added to the advanced epoxy and temperature stabilized at 115° C. A 1.38 g. of methanol solution of ethyltriphenylphosphonium acetate (70% NV) was then added to the advanced epoxy resin before a monomer mixture of the following was added:

| | |
|---|---|
| methacrylic acid | 161.2 g |
| styrene | 84.3 g |
| ethyl acrylate | 2.3 g |
| benzoyl peroxide-78 | 6.4 g (2% on monomer) |
| 2-butoxyethanol | 63.2 g |

The addition of monomer took about 2 hours, and then 35.4 g. of n-butanol was used as a rinse solvent for the addition funnel and added to the carbon graft copolymer mixture. Now the graft copolymer is ready for let down into water. To 2246 g. of deionized water was added 105.4 g. of dimethylethanolamine and 125.5 g. of 2-butoxyethanol. The water was heated to 50° C., and under high agitation, 1900 g. of graft copolymer solution was dropped into the warm water. A dispersion formed immediately. After all the resin was dropped, 375 g. of deionized water was added into the dispersion, and let stirred for overnight. The viscosity of the dispersion was very thick indicating very small particle size and very stable emulsion. Other constants for the dispersion are listed below:

| | |
|---|---|
| Nonvolatile | 19.1% |
| Acid Number | 81.1 |
| Base Number | 40.6 |
| % Neutralization | 50% |

The dispersion is diluted to ~9% nonvolatile, and the Ford #4 cup viscosity is 40 seconds. A normal carbon-graft copolymer as shown in U.S. Pat. No. 4,212,781 with ~6.8% of benzoyl peroxide on monomer without the ethyl triphenylphosphonium acetate added would have a 23% nonvolatile, and 60–70 seconds Ford #4 cup viscosity. If a carbon-graft copolymer is made with 2% of benzoyl peroxide on monomer, the dispersion in water will be pale in color, low in viscosity 20–30 seconds, and eventually would settle and be useless.

EXAMPLE 2

This carbon graft copolymer was made in the same as Example 1, except half the amount of ethyltriphenyl phosphonium acetate was added, 0.69 g. The constants for the dispersion made are listed in the following:

| | |
|---|---|
| Nonvolatile, NV | 24.9% |
| Acid number | 81.3 |
| Base number | 34.3 |
| % neutralization | 42.2 |
| Ford cup #4 visc. | 18 secs. (18.5% NV) |

The theoretical calculated Acid No. is 81.5 indicating that no esterification takes place and that the resulting polymer is a carbon graft copolymer.

EXAMPLE 3

Into a 5 liter, four-necked round bottom flask was charged 2542 g. of dispersion from Example 1 at 19.1% NV. The dispersion was heated under nitrogen sparge and agitation to 85° C. and 65.8 g of butylacrylate and 21.9 of N-isobutoxymethylacrylamide were added, and reaction mixture held at 85° C. for ½ hour. Now a monomer solution of 83.6 g of styrene and 4.6 g. of Lupersol-11 (a peroxy pivalate) from Lucidol Corporation) was added in 1½ hour, and the polymerization mixture held at 85° C. for one hour. A chaser of 2.3 g. of Lupersol-11 was then added, and reaction mixture held at 85° C. for one hour. The reaction mixture is quite thick, 162.3 g of deionized water is then added followed by another addition of 2.3 g of Lupersol-11. The mixture was held for ~1½ hours at 85° C. and then let cool. The constants for this dispersion are as follows:

| | |
|---|---|
| Nonvolatile | 18.1% |
| Acid number | 62.7 |
| Base number | 43.6 |
| % Neutralization | 69.6% |
| Organic solvents/solids | 0.64 |

We claim:

1. In a non-aqueous process for producing an epoxy-acrylic, carbon-graft copolymer comprising the reaction product of ethylenically unsaturated monomers, including acrylic monomers and carboxyl-functional acrylic monomers copolymerized in the presence of epoxy resin, the improvement comprising:

copolymerizing said monomers including at least about 20% carboxyl monomer based on the total weight of said monomers at temperatures from about 80° C. and 130° C. in the presence of an addition polymerization catalyst consisting of between about 0.5 and 3% peroxide in combination with 0.02% to 0.1% of a phosphonium cocatalyst based on the weight of said monomers copolymerized to produce a carbon-graft, acrylic-epoxy copolymer having at least 2% by weight free carboxyl groups and comprising by weight 10% to 70% acrylic component and 30% to 90% epoxy component; and where said epoxy-acrylic copolymer is at least partially neutralized by aminating the carboxyl groups with an amine compound and dispersing the same into water.

2. The process of claim 1 where the phosphonium cocatalyst is a triphenylphosphonium compound.

3. The process of claim 2 where the cocatalyst is selected from ethyl triphenylphosphonium acetate, ethyl triphenylphosphonium chloride, ethyl triphenylphosphonium bromide, and ethyl triphenylphosphonium iodide.

4. The process of claim 1 where the phosphonium cocatalyst is tetrabutylphosphonium acetate.

5. The process of claim 1 where the phosphonium cocatalyst is a formyl triphenylphosphonium selected from formylmethylenetriphenylphosphonium and formylmethyltriphenyl phosphonium halide.

6. The process of claim 1 where the phosphonium cocatalyst is selected from a phosphonium phosphate, a phosphonium formate, a phosphonium oxalate, and a phosphonium bicarbonate.

7. The process of claim 1 where the epoxy-acrylic copolymer has a carboxyl content of at least 2% by weight and said copolymer is dispersed into water by aminating at least part of said carboxyl groups with amine compound selected from a primary, secondary, or tertiary amine.

8. The process of claim 1 where the epoxy-acrylic copolymer is produced with 1% to 2% peroxide based on the weight of monomers copolymerized.

9. The process of claim 1 where the epoxy resin has a number average molecular weight between about 350 and 20,000 as measured by GPC.

10. The process of claim 1 where the peroxide comprises benzoyl peroxide.

* * * * *